United States Patent
Shi et al.

(10) Patent No.: US 9,383,598 B2
(45) Date of Patent: Jul. 5, 2016

(54) LIQUID CRYSTAL MODULE

(71) Applicants: BOE TECHNOLOGY GROUP CO., LTD., Beijing (CN); BEIJING BOE DISPLAY TECHNOLOGY CO., LTD., Beijing (CN)

(72) Inventors: Haijun Shi, Beijing (CN); Dan Wang, Beijing (CN); Seungmin Lee, Beijing (CN); Bin Zou, Beijing (CN); Bochang Wang, Beijing (CN); Kai Diao, Beijing (CN); Jian Yang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/315,510

(22) Filed: Jun. 26, 2014

(65) Prior Publication Data

US 2015/0301392 A1    Oct. 22, 2015

(30) Foreign Application Priority Data

Apr. 17, 2014   (CN) .......................... 2014 1 0156013

(51) Int. Cl.
  *G02F 1/1333*    (2006.01)
(52) U.S. Cl.
  CPC ............... *G02F 1/133308* (2013.01); *G02F 2001/133317* (2013.01); *G02F 2202/28* (2013.01)
(58) Field of Classification Search
  CPC ............. G02F 1/133308; G02F 2001/133314; G02F 2001/133322
  See application file for complete search history.

(56) References Cited

U.S. PATENT DOCUMENTS

| | | | | |
|---|---|---|---|---|
| 2009/0079894 | A1* | 3/2009 | Okuda | G02F 1/133308 349/58 |
| 2010/0066937 | A1* | 3/2010 | Yamashita | G02B 6/0085 349/58 |
| 2012/0162566 | A1* | 6/2012 | Shimomichi | G02F 1/133308 349/58 |
| 2015/0131024 | A1* | 5/2015 | Sakamoto | G02F 1/133308 349/58 |

FOREIGN PATENT DOCUMENTS

| | | |
|---|---|---|
| CN | 102053403 A | 5/2011 |
| CN | 103197454 A | 7/2013 |
| CN | 103246093 A | 8/2013 |
| KR | 20130028272 A | 3/2013 |

OTHER PUBLICATIONS

First Office Action regarding Chinese application No. 201410156013.8, dated Feb. 24, 2016. Translation provided by Dragon Intellectual Property Law Firm.

* cited by examiner

*Primary Examiner* — Timothy L Rude
(74) *Attorney, Agent, or Firm* — Harness, Dickey & Pierce, P.L.C.

(57) ABSTRACT

The present invention relates to a liquid crystal module including a panel, a backlight unit arranged at a back side of the panel, and a connection structure that connects the panel and the backlight unit. The connection structure includes a supporting surface that supports the panel, and is made of stainless steel. The present invention provides advantages that the connection structure made of stainless steel satisfies borderless needs of the liquid crystal module, and the liquid crystal module is capable of avoiding light leakage when the liquid crystal panel is in a L0 black color state of grayscale. Herein, the light leakage is caused by a deformation of the panel.

6 Claims, 1 Drawing Sheet

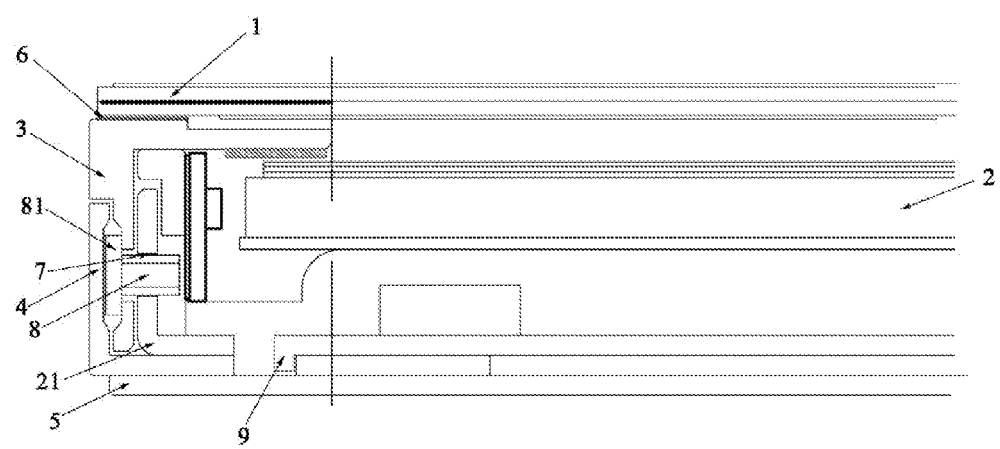

LIQUID CRYSTAL MODULE

CROSS-REFERENCE TO RELATED APPLICATION

This application claims priority to Chinese Patent Application No. 201410156013.8 filed on Apr. 17, 2014, the disclosures of which are incorporated in their entirety by reference herein.

TECHNICAL FIELD

The present invention relates to technical field of a liquid crystal product, particularly relates to a borderless liquid crystal module.

BACKGROUND

In existing borderless structure, a single plastic frame is added to a backlight unit (BLU), the plastic frame is engaged with the BLU and adhered to the panel via a double-sided tape in order to support the panel. An assembling of this kind of structure is too complicated, and the structure has a low strength, the plastic frame becomes deformed easily, the panel becomes deformed caused by a non-uniform force applied to the panel, the non-uniform force is generated by the deformation of the plastic frame, when the liquid crystal panel is in L0 black color state of grayscale, a light leakage occurs to the liquid crystal panel.

SUMMARY

In order to solve above-described technical problem, the present invention provides a liquid crystal module that avoids a light leakage when a liquid crystal panel is in L0 black color state of grayscale.

In order to provide the above-described advantage, the present invention provides the following technical solutions.

A liquid crystal module includes: a panel; and a backlight unit arranged at a back side of the panel, wherein the liquid crystal module further includes a connection structure that connects the panel with the backlight unit, the connection structure has a supporting surface that supports the panel, and the connection structure is made of stainless steel.

Further, the connection structure may be arranged at the back side of the panel, and an adhesive layer may be arranged between the supporting surface and the panel.

Further, the connection structure may include: a supporting portion that supports the panel, the supporting surface may be arranged on the supporting portion; and a connection portion that is connected with the backlight unit.

Further, a threaded hole may be formed in the connection portion, and a bolt may be inserted through the threaded hole so that the connection structure is fixed to a back plate of the backlight unit.

Further, the liquid crystal module may further include a bolt covering portion that covers a head portion of the bolt, the bolt covering portion may be arranged between a back shell and the back plate.

Further, the connection structure may include a stepped portion having a first step surface and a second step surface, the first step surface may be formed by an external side surface of the supporting portion and the second step surface may be formed by an external side surface of the connection portion, the bolt covering portion may include: a first portion arranged on the second step surface, an external surface of the first portion and the first step surface being arranged on the same plane; and a second portion fixed between the back shell and the back plate.

Further, the second portion may extend from the first portion in a direction away from the panel, and then is bent with respect to the first direction and is parallel to the panel.

Further, a positioning structure for positioning the connection structure may be arranged on the back plate of the backlight unit.

Further, the adhesive layer may be provided by a double-sided tape.

Further, the connection structure may be provided by an integral structure.

The present invention provides the advantages that the connection structure made of stainless steel satisfies borderless needs of the liquid crystal module, and the liquid crystal module is capable of avoiding light leakage when the liquid crystal panel is in a L0 black color state of grayscale. Herein, the light leakage is caused by a deformation of the panel.

BRIEF DESCRIPTION OF THE DRAWINGS

FIG. 1 is a schematic diagram showing a configuration of a liquid crystal module according to an embodiment of the present invention.

DETAILED DESCRIPTION

The embodiments described herein are for descriptive purposes, and are not intended to limit the protection scope of the present disclosure.

As shown in FIG. 1, the present embodiment provides a liquid crystal module including: a panel 1 and a backlight unit 2 arranged at a back side of the panel. The liquid crystal module further includes a connection structure 3 that connects the panel 1 with the backlight unit 2, the connection structure 3 has a supporting surface that supports the panel 1, and the connection structure is made of stainless steel.

The connection structure 3 made of stainless steel satisfies borderless needs of the liquid crystal module, and the liquid crystal module is capable of avoiding light leakage when the panel 1 is in a L0 black color state of grayscale. Herein, the light leakage is caused by a deformation of the panel 1.

In the present embodiment, the connection structure 3 is arranged at the back side of the panel 1, and an adhesive layer 6 is arranged between the supporting surface and the back surface of the panel 1.

In the present embodiment, the connection structure 3 made of stainless steel having a relatively high strength supports the panel 1, and is fixed to the panel 1 by adhesive manner. Thus, a requirement for borderless design is achieved. When the connection structure 3 is adhered to the panel 1, the panel 1 is easy to become deformed caused by a deformation of a supporting structure. Since the connection structure 3 is made of stainless steel, the deformation of the panel 1 can be properly solved. With an improvement in a manufacturing of the panel 1, the panel 1 depends less on a flatness of the backlight unit 2.

Under a condition that the connection structure 3 is capable of connecting the panel 1 with the backlight unit 2 and supporting the panel 1, the connection structure 3 may be provided by other different structures.

In the present embodiment, the connection structure 3 includes a supporting portion that supports the panel 1 and a connection portion that is connected with the backlight unit 2. The supporting surface is arranged on the supporting portion.

Further, a threaded hole 7 is formed in the connection portion, and a bolt 8 is inserted through the threaded hole 7 so that the connection structure 3 is fixed to a back plate 21 of the backlight unit 2.

Further, a positioning structure 9 for positioning the connection structure 3 is arranged on the back plate 21 of the backlight unit 2.

The connection structure 3 is positioned on the back plate 21 via the positioning structure 9, and then, fixed by the bolt 8 so that the connection structure is assembled.

Under a condition that the connection structure 3 is positioned and assembled by the positioning structure 9, the positioning structure 9 may be provided by various structures, such as a slot that is engaged with the connection structure 3.

Further, the liquid crystal module further includes a bolt covering portion 4 that covers a head portion 81 of the bolt 8. The bolt covering portion 4 is arranged between the back shell 5 (a back shell of the liquid crystal module) and the back plate 21.

In the present embodiment, the connection structure 3 made of stainless steel supports the panel 1 and fixes the panel 1 by an adhesive manner, at the same time, the bolt covering portion covers a bolt 8 (or screw) at a side surface. Thus, an entire appearance becomes further aesthetic.

In the present embodiment, the connection structure has a stepped portion at an outside portion. The stepped portion includes a first step surface formed by an external side surface of the supporting portion and a second step surface formed by an external side surface of the connection portion. The bolt covering portion 4 includes a first portion arranged on the second step surface and a second portion fixed between the back shell and the back plate. An external surface of the first portion and the first step surface are arranged on the same plane. The second portion extends in a direction from the first portion toward external side (a direction away from the panel) and then is bent toward internal side (a direction toward the panel). The first portion and the second portion may be formed by an integral structure or formed by other methods.

The entire connection structure 3 is positioned at the back side of the panel 1, and after assembling the bolt covering portion 4, the external surface of the first portion of the bolt covering portion is on the same plane with the first step surface. Thus, an entire appearance becomes further aesthetic.

Further, the adhesive layer 6 may be provided by a double-sided tape. The adhesive layer 6 may also be provided by a glue or adhesive paste that is directly pasted on the supporting surface.

Further, the connection structure 3 may be provided by an integral structure.

In a design of the liquid crystal module according to an existing technology, a plastic frame is engaged with the backlight unit 2. Thus, the liquid crystal module according to the existing technology has a low strength and low mechanical reliability. In the present embodiment, the connection structure 3 is provided by a one body structure (under a condition of one integral body, a forming process may include molding, welding and the like). Thus, a flatness of entire body is secured, and the stainless steel-made connection structure 3 can secure the strength and avoids the light leakage when the liquid crystal panel 1 is in L0 black color state of grayscale The referred embodiments of the present invention are described above, it should be noted that for a person skilled in the art, without departing from a spirit of the present invention, further improvements and modifications can be made, and these improvements and modifications are also included in the scope of the present invention.

What is claimed is:

1. A liquid crystal module comprising:
   a panel;
   a backlight unit arranged at a back side of the panel;
   a connection structure that connects the panel with the backlight unit, the connection structure has a supporting surface that supports the panel, and the connection structure is made of stainless steel and is arranged at the back side of the panel, and an adhesive layer is arranged between the supporting surface and the panel, the connection structure comprises:
      a supporting portion that supports the panel, the supporting surface is arranged on the supporting portion; and
      a connection portion that is connected with the backlight unit, wherein a threaded hole is formed in the connection portion, and a bolt is inserted through the threaded hole so that the connection structure is fixed to a back plate of the backlight unit; and
   a bolt covering portion that covers a head portion of the bolt, the bolt covering portion is arranged between a back shell and the back plate.

2. The liquid crystal module according to claim 1, wherein:
   the connection structure comprises a stepped portion having a first step surface and a second step surface;
   the first step surface is formed by an external side surface of the supporting portion and the second step surface is formed by an external side surface of the connection portion; and
   the bolt covering portion comprises:
      a first portion arranged on the second step surface, an external surface of the first portion being arranged on a same plane with the first step surface; and
      a second portion fixed between the back shell and the back plate.

3. The liquid crystal module according to claim 2, wherein the second portion extends from the first portion in a direction away from the panel, and then is bent with respect to the first direction and is parallel to the panel.

4. The liquid crystal module according to claim 1, wherein a positioning structure for positioning the connection structure is arranged on the back plate of the backlight unit.

5. The liquid crystal module according to claim 1, wherein the adhesive layer is provided by a double-sided tape.

6. The liquid crystal module according to claim 1, wherein the connection structure is provided by an integral structure.

* * * * *